(12) United States Patent
Wittenberg (10) Patent No.: US 9,120,276 B2
(45) Date of Patent: Sep. 1, 2015

(54) LAMINATED COMPOSITE BENDING AND STIFFENING MEMBERS WITH REINFORCEMENT BY INTER-LAMINAR METAL SHEETS

(75) Inventor: Thomas C. Wittenberg, Edmonds, WA (US)

(73) Assignee: The Boeing Company, Chicago, IL (US)

(*) Notice: Subject to any disclaimer, the term of this patent is extended or adjusted under 35 U.S.C. 154(b) by 125 days.

(21) Appl. No.: 13/557,433

(22) Filed: Jul. 25, 2012

(65) Prior Publication Data

US 2014/0030478 A1   Jan. 30, 2014

(51) Int. Cl.
| | |
|---|---|
| *B32B 1/04* | (2006.01) |
| *B32B 3/08* | (2006.01) |
| *B32B 15/08* | (2006.01) |
| *B32B 15/14* | (2006.01) |
| *B32B 7/12* | (2006.01) |
| *B29C 70/88* | (2006.01) |
| *B32B 15/04* | (2006.01) |
| *B29D 99/00* | (2010.01) |
| *B32B 1/00* | (2006.01) |
| *B64C 1/06* | (2006.01) |
| *B64C 3/18* | (2006.01) |
| *B29L 31/00* | (2006.01) |

(52) U.S. Cl.
CPC .......... *B29C 70/885* (2013.01); *B29D 99/0003* (2013.01); *B32B 1/00* (2013.01); *B32B 1/04* (2013.01); *B32B 7/12* (2013.01); *B32B 15/043* (2013.01); *B32B 15/08* (2013.01); *B32B 15/14* (2013.01); *B29L 2031/003* (2013.01); *B32B 2250/40* (2013.01); *B32B 2250/42* (2013.01); *B32B 2260/023* (2013.01); *B32B 2262/106* (2013.01); *B32B 2305/076* (2013.01); *B32B 2311/18* (2013.01); *B32B 2605/18* (2013.01); *B64C 1/06* (2013.01); *B64C 1/064* (2013.01); *Y10T 156/1002* (2015.01); *Y10T 428/24322* (2015.01); *Y10T 428/24628* (2015.01)

(58) Field of Classification Search
None
See application file for complete search history.

(56) References Cited

U.S. PATENT DOCUMENTS

| | | | |
|---|---|---|---|
| 3,321,019 A | 5/1967 | Dmitroff et al. | |
| 3,995,080 A * | 11/1976 | Cogburn et al. | ............. 428/34.5 |
| 4,966,802 A * | 10/1990 | Hertzberg | ..................... 428/119 |
| 5,733,390 A | 3/1998 | Kingston | |
| 5,866,272 A | 2/1999 | Westre et al. | |
| 6,173,925 B1 * | 1/2001 | Mueller et al. | ................. 244/219 |

(Continued)

FOREIGN PATENT DOCUMENTS

| | | |
|---|---|---|
| DE | 102009024397 A1 | 12/2010 |
| EP | 1336469 A1 | 8/2003 |

(Continued)

OTHER PUBLICATIONS

Machine translation of WO 0056541 A1, Sep. 2000.*

(Continued)

*Primary Examiner* — Aaron Austin
*Assistant Examiner* — Jeff Vonch
(74) *Attorney, Agent, or Firm* — Kunzler Law Group, PC (57) ABSTRACT

A laminated reinforced member that provides bending and stiffening support and that includes metal reinforcing sheets, and a method of making the member. Metal reinforcing sheets at connection locations eliminate the need for additional external connection reinforcements for engaging connectors.

11 Claims, 12 Drawing Sheets

(56) References Cited

U.S. PATENT DOCUMENTS

| | | | |
|---|---|---|---|
| 6,460,240 B1 * | 10/2002 | Kielies et al. | 29/469.5 |
| 7,115,323 B2 | 10/2006 | Westre et al. | |
| 7,678,437 B2 * | 3/2010 | Escobar Benavides et al. | 428/57 |
| 8,074,694 B2 * | 12/2011 | Brook et al. | 156/523 |
| 8,333,345 B2 * | 12/2012 | Kajita et al. | 244/123.1 |
| 8,540,916 B2 * | 9/2013 | Kubryk et al. | 264/258 |
| 8,795,804 B2 * | 8/2014 | Hamada et al. | 428/60 |
| 8,821,666 B2 * | 9/2014 | Bechtold et al. | 156/166 |
| 8,844,872 B2 * | 9/2014 | Sanderson et al. | 244/123.1 |
| 2003/0168555 A1 * | 9/2003 | Livi et al. | 244/132 |
| 2008/0217806 A1 * | 9/2008 | Aijima | 264/171.1 |
| 2009/0176066 A1 * | 7/2009 | Darrow et al. | 428/175 |
| 2010/0133380 A1 * | 6/2010 | Roebroeks et al. | 244/119 |
| 2010/0148004 A1 * | 6/2010 | Beumler | 244/119 |
| 2010/0304094 A1 * | 12/2010 | Brook et al. | 428/174 |
| 2011/0052910 A1 * | 3/2011 | Gunnink et al. | 428/337 |
| 2011/0236622 A1 * | 9/2011 | Tacke et al. | 428/114 |
| 2013/0034705 A1 * | 2/2013 | Matsen et al. | 428/189 |
| 2014/0186578 A1 * | 7/2014 | Outon Hernández et al. | 428/119 |

FOREIGN PATENT DOCUMENTS

| | | | | |
|---|---|---|---|---|
| GB | 2041824 A | * | 9/1980 | B32B 5/26 |
| WO | WO 0056541 A1 | * | 9/2000 | |
| WO | WO 2004085141 A1 | * | 10/2004 | B32B 3/06 |
| WO | WO 2010034594 A1 | * | 4/2010 | B64C 1/06 |

OTHER PUBLICATIONS

European Patent Application No. 13174326.2 Extended European Search Report mailed Nov. 13, 2013.

Arai, Norio, et al., Mechanical Properties of CFRP/TI-Alloy Laminated Composites, 16th International Conference on Composite Materials, 2007, pp. 1-7.

Fink, A., et al., CFRP/Titanium Hybrid Material Improving Composite Structure Coupling, Institute of Structural Mechanics, German Aerospace Center (DLR), 4 pages, Sep. 2005.

Fink, A., et al., Hybrid CFRP/Titanium Bolted Joints: Performance Assessment and Application to a Spacecraft Payload Adaptor, Composites Science and Technology, 2010, pp. 305-317, vol. 70.

Johnson, W.S., et al., Hybrid Titanium Composite Laminates: A New Aerospace Material, NASA-Langley Research Center, 3 pages, 1998.

Oken, S. et al., Analytical and Experimental Investigation of Aircraft Metal Structures Reinforced with Filamentary Composites, Phase I—Concept Development and Feasibility, NASA Contractor Report, Dec. 1971, pp. 1-121.

Papakonstantinos, Katakalos, Mechanical Behavior of High Temperature Hybrid Fiber/Titanium Laminates, Journal of Engineering Materials and Technology, Apr. 2009, 10 pages, vol. 131.

* cited by examiner

LAMINATED COMPOSITE BENDING AND STIFFENING MEMBERS WITH REINFORCEMENT BY INTER-LAMINAR METAL SHEETS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

FIELD

This disclosure relates to reinforcement of laminated composite members. Various embodiments relate to fiber reinforced laminated composite stiffening and bending members.

BACKGROUND

Carbon fiber reinforced plastic ("CFRP") is widely used to provide structural members having a high strength to weight ratio. Carbon fiber reinforced plastics are fabricated from polymeric composites including thermosetting or thermoplastic polymer ("resin") matrix within which are embedded carbon fibers. CFRP structural members may be formed by layers of fiber reinforced sheets and then bonding the sheets to form a composite member. These composites are widely used for aircraft structures, for example, the fuselage, wings, and other components of the aircraft's outer shell. These composites may be reinforced by thin metal sheets between layers of the composite member to enhance structural integrity of the member.

CFRP is also used to form bending and stiffening members for structures such as aircraft. Bending and stiffening members are typically elongate members formed to have a cross section that resists bending about axes lying in the cross section. I sections, T sections and C sections are examples of such members. Forming such members of laminated CFRP sheets provides a member having advantageous strength along the member for bending and stiffening. However, applying loads to such members at connections such as to other members or components presents difficulties.

CFRP members provide significant strength along the directions lying along the sheets that comprise the member. However the strength of such members through their thickness, a direction from sheet to sheet, is primarily the strength of the bonds between sheets and the strength of the plastic matrix of sheets that support fibers. Those strengths are orders of magnitude less than the strength of the fiber reinforced sheet in directions along which fibers extend. This low through thickness strength presents problems at connections to bending and stiffening members. Such connections can be by conventional connectors such as bolts or rivets extending through an opening that extends in a through thickness direction of the CFRP member. Loads applied to the CFRP member by such connectors can damage the CFRP member by causing delamination of sheets forming the member or damage to the matrix within which the fibers are embedded. Such damage typically occurs in regions where the load path changes direction from one plane to another plane that is inclined to said one plane (e.g. the radius detail when transitioning from a flange to a web).

Figure 1:
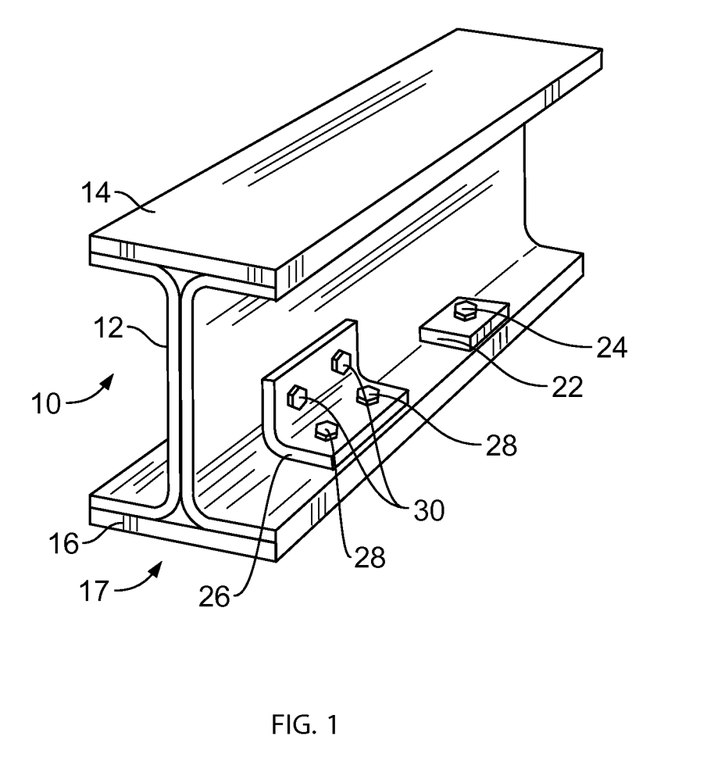
FIG. 1 illustrates a prior art I section member with a radius block and an angle fitting for connection reinforcement.

FIG. 1 shows known reinforcements for connection to an I section CFRP member 10. The member 10 is formed by two separated generally parallel flanges 14 and 16 that are connected by a web 12 extending between and generally perpendicular to the flanges 14 and 16. FIG. 1 illustrates two connection reinforcements, radius block 22 and angle fitting 26. Radius block 22 and angle fitting 26 strengthen connections to the member 10 through the flange 16 from a surface 17 that faces oppositely from the flange 14. The connectors 24 and 28 extend through the flange 16 to connect to a component or member adjacent to the surface 17.

The connector 24 includes a section that overlies the radius block 22 and another section that extends through the radius block 22 and the flange 16. The radius block 22 is positioned adjacent to a surface of the flange 16 opposite the surface 17 to distribute any load applied through the connector 24 to the flange 16. The connectors 28 similarly extend through the angle fitting 26 and the flange 16. In addition, the angle fitting 26 extends adjacent to the web 12 and connectors 30 extend through the angle fitting 26 and the web 12 to additionally reinforce the flange 16 to web 12 integrity of the member 10 and to transfer load from the connectors 28 to the web 12.

Radius blocks, angle fittings and similar connection reinforcements for applying loadings to CFRP members provides needed connection strength for CFRP members. Such connection reinforcements are additional parts that must be positioned and secured during assembly of structures that include connections to bending or stiffening members such as member 10. These additional parts and the effort required for their assembly into a structure adds cost to structures that include bending or stiffening members such as member 10 and adds effort to assembly of those structures.

BRIEF SUMMARY

In one aspect, laminated bending and stiffening members are described that are fabricated to support connection loads that are applied by connectors without external reinforcing members such as radius blocks and angle fittings.

In another aspect, laminated carbon fiber reinforced plastic bending and stiffening members are described that are fabricated to support loads applied by connectors that engage the member without external reinforcing members and to transfer load to sections of the member adjacent to the location at which the connector engages the member.

In still another aspect, laminated bending and stiffening members are described that include reinforcing layers within the member that provide strength to support loads that are applied to the member.

In yet another aspect, a method is provided for fabricating laminated members in configurations that are used for bending and stiffening members and that include reinforcing layers within the member.

In an additional aspect, a method is provided for fabricating laminated members in configurations that are used for bending and stiffening members and that provide strength to transfer load from connectors to the member without external reinforcements such as radius blocks and angle fittings.

In yet an additional aspect, forming metal sheets to the shape of a portion of a CFRP member at which a connector engages the member is described as well as laminating the metal sheets into the CFRP member to reinforce the member.

In still an additional aspect, forming metal sheets to the shape of a portion of a CFRP member at which a connector engages the member and the shape of one or more adjacent sections of the CFRP member is described and laminating the metal sheets into the CFRP member to reinforce the member at the connector location and to reinforce the transition to adjacent sections of the CFRP member.

DESCRIPTION OF EMBODIMENTS

The described embodiments concern support of loads applied by laminated members, including loads applied by connectors. In particular, bending or stiffening members formed of laminated fiber reinforced sheets and by thin metal sheets are described. Metal sheets may be provided within a bending and stiffening member at a location at which a connector extends through the member. The thin metal sheets extend from the connector to strengthen the laminated bending or stiffening member to carry loads applied by the connector.

The various embodiments will now be described more fully hereinafter with reference to the accompanying drawings, in which such embodiments are shown. The various embodiments may, however, be embodied in many different forms and should not be construed as limited to the embodiments set forth herein. Rather, these embodiments are examples which have the full scope indicated by the claims. Like reference numbers refer to like elements throughout.

Figure 2:
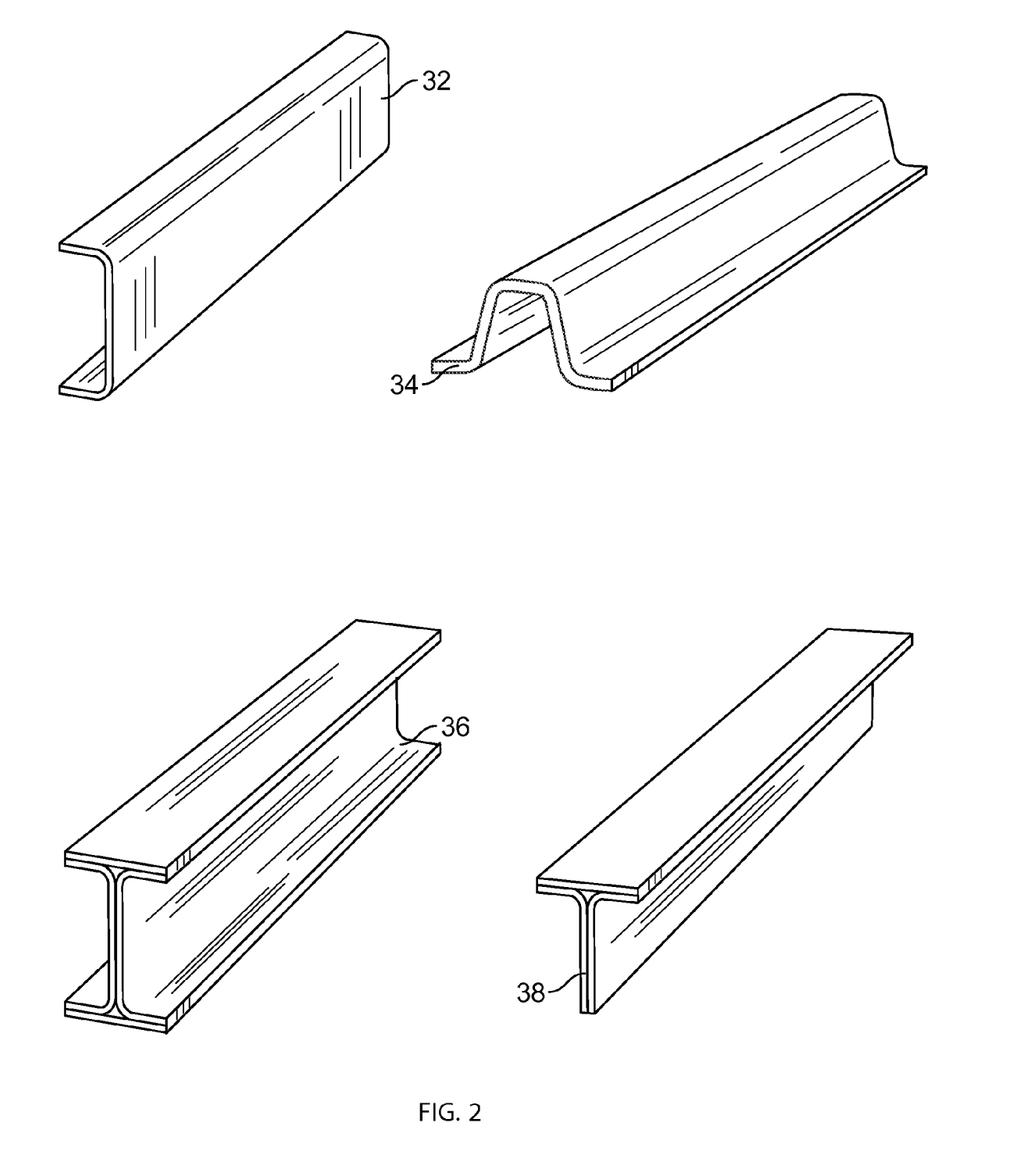
FIG. 2 shows bending and stiffening members that may embody the invention.

FIG. 2 shows four bending and stiffening members having different cross sections that may be formed by laminated carbon fiber reinforced sheets. Member 32 is a member having a C-shaped cross section and member 34 is a member having a Hat-shaped cross section. Member 36 is a member having an I-shaped cross section and member 38 is a member having a T-shaped cross section. Members 32 and 34 may be formed as a single component as described below. Members 36 and 38 may be formed from multiple components as also described below.

Figure 3:
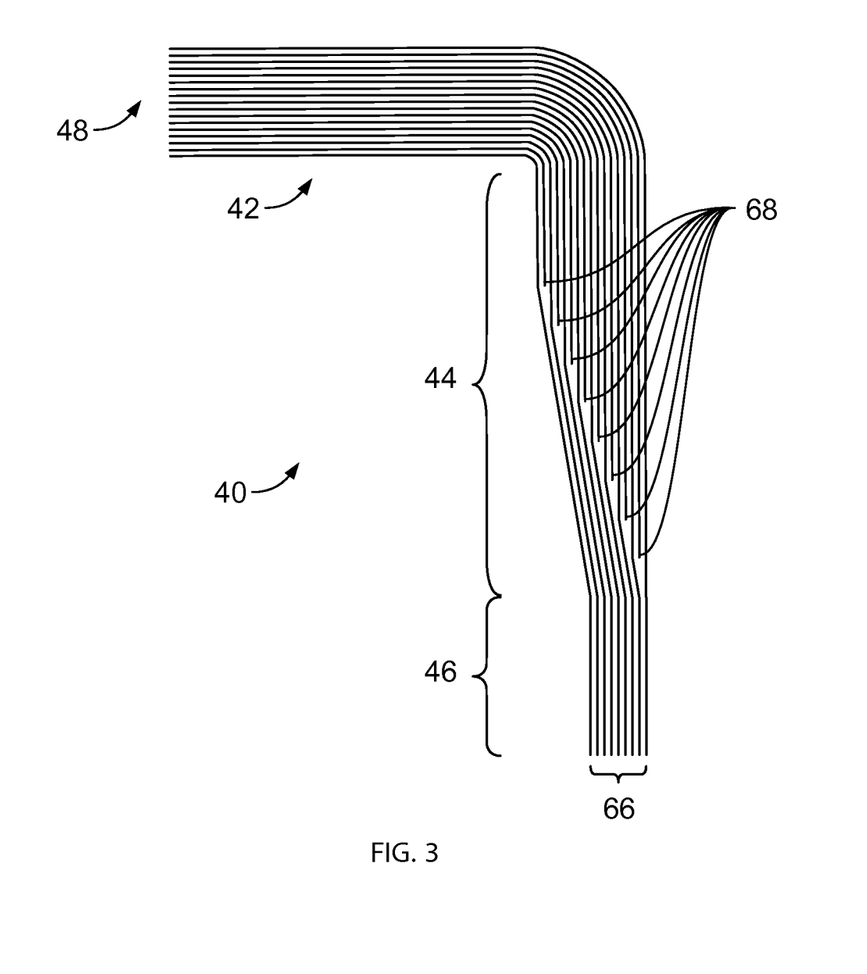
FIG. 3 is a cross section of a flange and a portion of an adjacent web of a C-shaped section.

FIG. 3 is a cross section of a portion 40 of a member having a C-shaped cross section such as member 32. FIG. 3 shows a flange 42 that extends along a flange direction from an outer side 48 to a web section 44 where the portion 40 bends approximately 90 degrees so that the web section 44 extends generally perpendicular to the flange 42 to a web section 46 that continues from and along the direction of the section 44.

The sections 42, 44 and 46 include layers of carbon fiber reinforced plies 66. The carbon fiber reinforced plies 66 extend from outer side 48 of the flange 42 through the flange 42, through the web section 44 and continue through the web section 46. The CFRP plies 66 are between 0.005 and 0.010 inches thick and may be tape or fabric and may also be impregnated with a thermoset or thermoplastic adhesive matrix. The flange 42 and web section 44 also include titanium sheets 68 that extend from the outer side 48 along the flange 42 and into the web section 44. The titanium sheets 68 are between 0.004 and 0.020 inches thick. This range of thickness provides favorable lamination to CFRP sheets. The titanium sheets 68 bend with the member to extend through the flange 42 and along the web section 44. As shown by FIG. 3, each titanium sheet 68 is positioned at least between two carbon fiber reinforced plies 66 and extends through the flange 42 into the web section 44. The titanium sheets 68 extend from the flange 42 progressively greater distances along the web 44 as their distance from the outer side 48 increases. The web section 44 decreases in width along the flange direction as distance from the flange 42 increases as number of titanium sheets 68 at the location decreases. The width of the web section 46 remains constant as it is comprised only of the carbon fiber reinforced plies 66.

Figure 4:
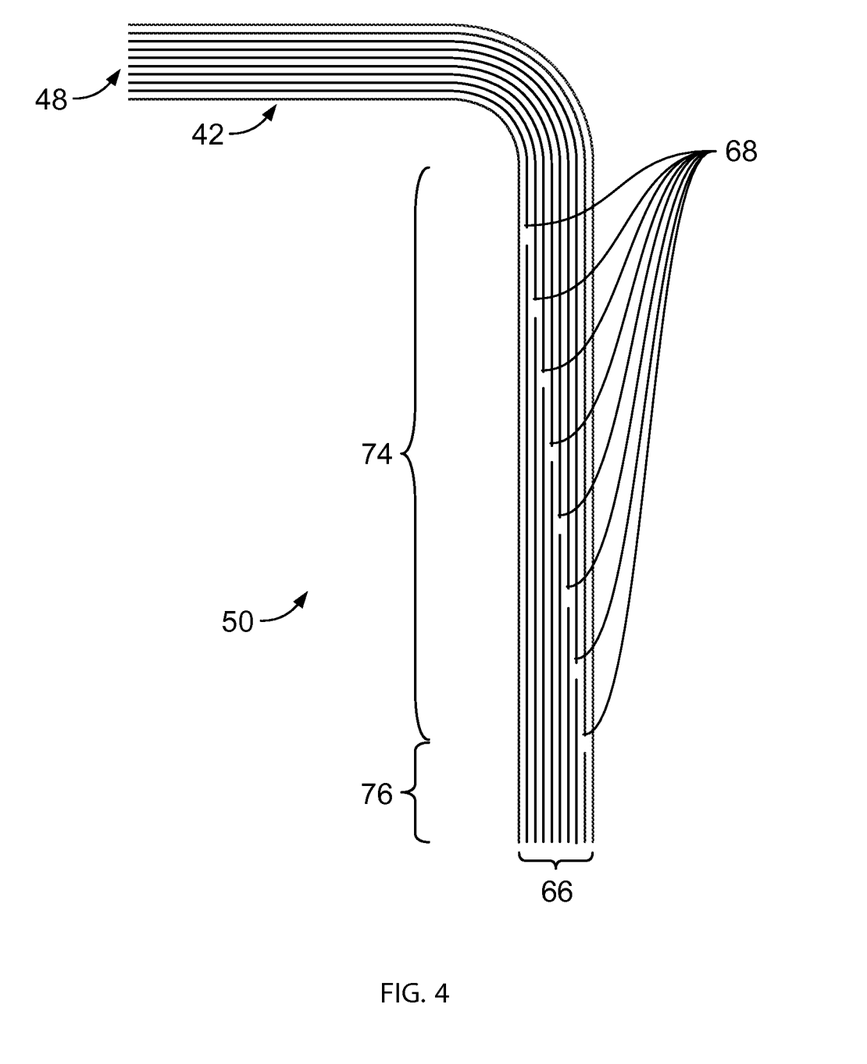
FIG. 4 is a cross section of another configuration of a flange and a portion of an adjacent web of a C-shaped section.

FIG. 4 is a cross section of a portion 50 of a C-shaped section such as member 32. FIG. 4 shows a flange 42 that extends along a flange direction from an outer side 48 to a web section 74 where the member bends approximately 90 degrees so that the web section 74 extends generally perpendicular to the flange 42 to a web section 76 that continues from and along the direction of the section 74. The sections 42, 74 and 76 include laminated layers of carbon fiber reinforced plies 66 that extend from the outer side 48 through the flange 42, the web section 74 and the web section 76. As shown by FIG. 4, titanium sheets 68 extend from the outer side 48 through the flange 42 and web section 74. The titanium sheets 68 bend with the portion 50 to extend along the web section 74 away from the flange 42. The titanium sheets 68 extend from the flange 42 progressively greater distances along the web 74 as their distance from the outer side 48 increases. Beginning near the farthest extent of a titanium sheet 68 along the web section 74, a carbon fiber reinforced ply 66 is positioned adjacent to the titanium sheet 78 and extends along the web sections 74 and 76. As shown by FIG. 4, the carbon fiber reinforced plies 66 that form part of the flange 42 and web section 74 extend from outer side 48 through the flange 42, the web section 74 and continue through the web section 76. The web section 74 remains approximately the same width as distance from the flange 42 increases due to carbon fiber plies 66 that continue along the flange sections 74 and 76 extending from the titanium sheets 68.

The titanium sheets 68 of the portion 40 shown by FIG. 3 are positioned between two carbon fiber reinforced plies 66. The titanium sheets 68 of the portion 50 shown by FIG. 4 are positioned adjacent to one or more titanium sheets 68. An adhesive film is applied between adjacent titanium sheets 68 of the portion 50 shown by FIG. 4.

Figure 5:
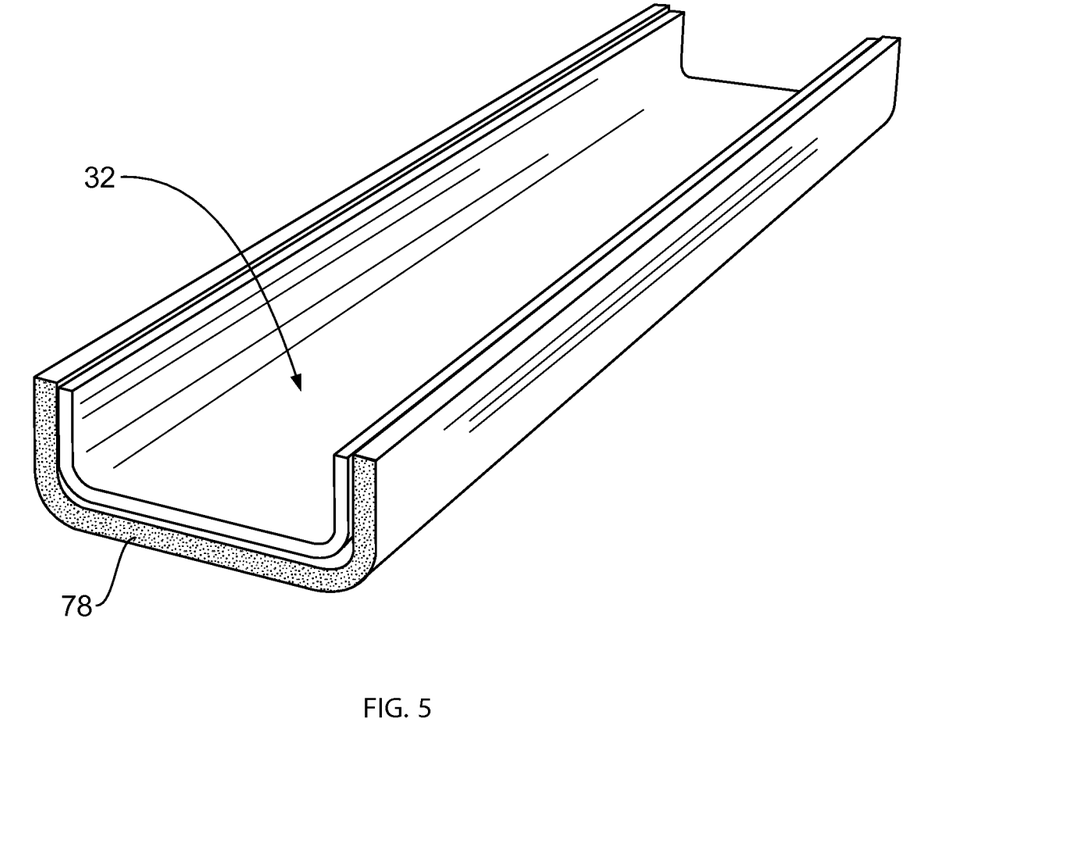
FIG. 5 is a perspective view of a C-shaped member and lay up form for fabricating the member.

FIG. 5 shows a C-shaped channel member 32 positioned within a formed support 78 that is shaped to support the member 32. The member 32 is a laminated member that may be formed of carbon fiber reinforced plies 66 and titanium sheets 68. The member 32 is formed in the support 78 by a lay-up process. The titanium sheets 68 are formed to the bent configuration shown by FIGS. 3 and 4 and are then degreased. A sol-gel procedure is then applied to the titanium sheets. A layer of primer is applied to the bent titanium sheets if storage for any duration is required. The carbon fiber reinforced plies 66 and bent titanium sheets 68 are placed in the formed support 78 adjacent to each other as described above. The lay-up process includes application of the adhesive that is used to form the reinforced plies 66 between adjacent plies 66. For configurations such as that of portion 50 shown by FIG. 4 in which titanium sheets 68 are adjacent to each other, an adhesive film is applied between adjacent titanium sheets 68. After the plies 66 and titanium sheets 68 are layed up to the configuration described above, they are vacuum bagged and cured at an appropriate elevated temperature and under surrounding pressure to cure the resin of the plies 66 and to bond the plies 66 and the titanium sheets 68. The curing process creates a unitary composite member.

Figure 6:
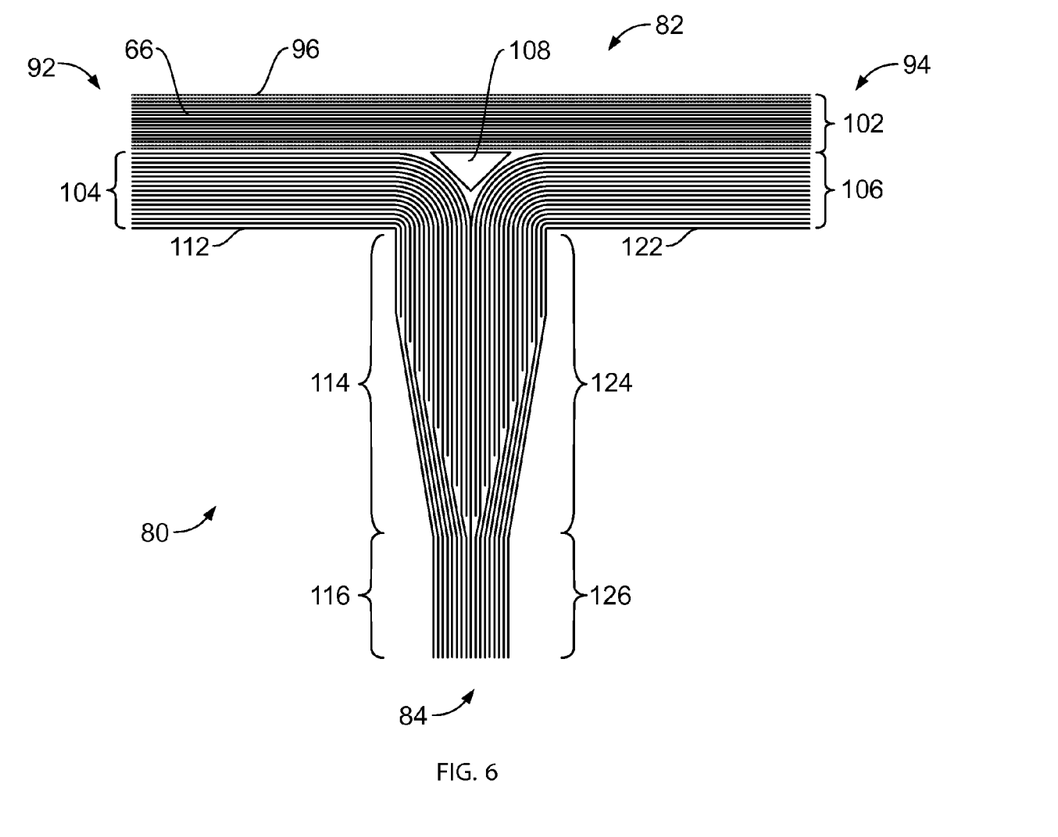
FIG. 6 is a cross section of a T-shaped section.

FIG. 6 shows a cross section of a CFRP member 80 forming a T shaped section having a flange 82 joined to a web 84. The flange 82 extends in a width direction from a first outer side 92 to a second outer side 94. The flange 82 forms a top surface 96 that extends from the first outer side 92 to the second outer side 94. The web 84 extends from the flange 82 oppositely from the flange top surface 96.

The T-shaped member 80 is formed by four components, an outer flange section 102, two angle sections 104 and 106 and a gap filling noodle 108. The outer flange section 102 extends from the first outer side 92 to the second outer side 94 and from the flange top surface 96 to form a portion of the flange 82 extending from the flange top surface 96 toward the web 84. The angle section 104 has a flange section 112 that forms a section of the flange 82 that extends from the first outer side 92 to the web 84 and then bends to extend from the flange 82 oppositely from the flange top surface 96 to form a section of the web 84. The flange section 112 is adjacent to the outer flange section 102 such that the flange section 112 and the outer flange section 102 together form the flange adjacent to the first outer side 92. The angle section 106 has a flange section 122 that forms a section of the flange 82 that extends from the second outer side 94 to the web 84 and then bends to extend from the flange 82 oppositely from the flange top surface 96 to form a section of the web 84. The flange section 122 is adjacent to the outer flange section 102 such that the flange section 122 and the outer flange section 102 together form the flange adjacent to the second outer side 94. The angle sections 104 and 106 meet each other adjacent to the flange outer section 102 and extend adjacent to each other to form the web 84. The flange outer section 102 and the angle sections 104 and 106 bound a void at the location adjacent to the angle section bends. The noodle 108 is adjacent to the flange outer section 102 and the angle sections 104 and 106 to fill that void. The noodle 108 may be formed of adhesive filler or adhesive filler in combination with rolled up fibers. Alternatively, the noodle may be formed of a low-density foam.

The outer flange section 102 is formed by laminated layers of carbon fiber reinforced plies 66. The CFRP plies 66 are between 0.005 and 0.010 inches thick and may be tape or fabric and are impregnated with a thermoset or thermoplastic adhesive matrix.

Figure 7:
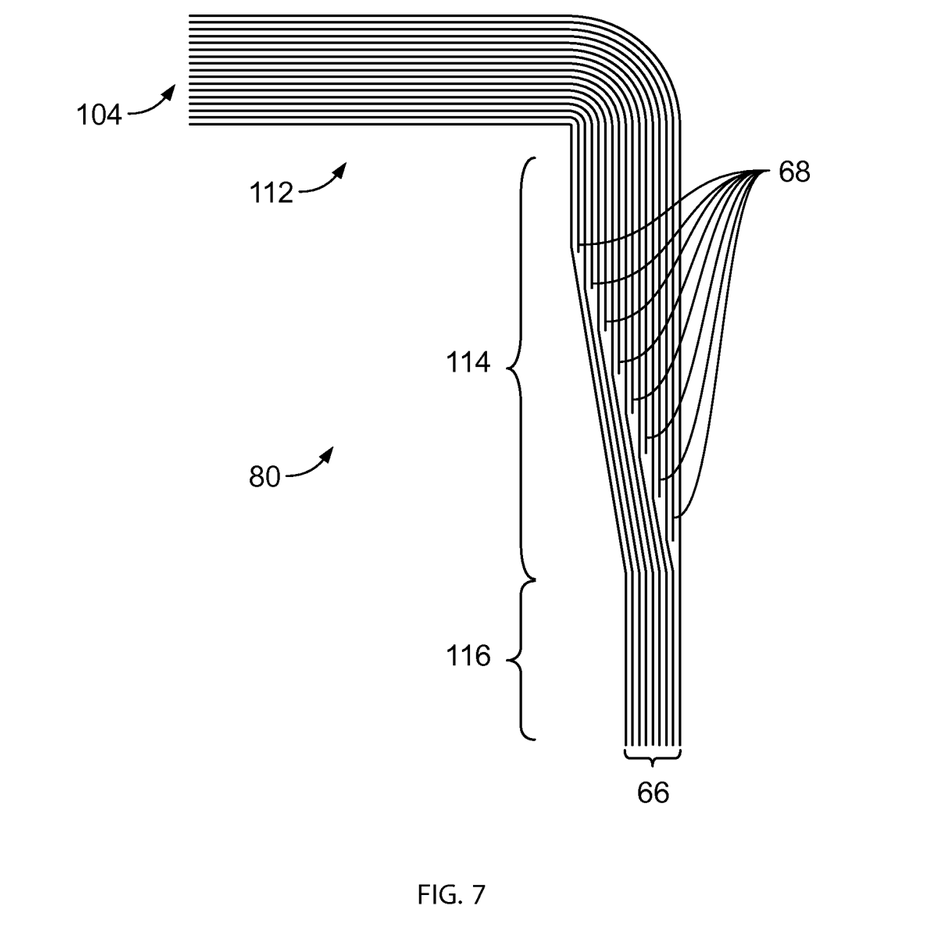
FIG. 7 is a cross section of a component of the T-shaped section shown by FIG. 6.

The angle sections 104 and 106 are formed by laminated layers of carbon fiber reinforced plies 66 and, in the regions forming part of the flange 82 and the region of the web 84, also formed of titanium sheets 68. The titanium sheets 68 are between 0.004" and 0.020" thick. This range of thickness provides favorable lamination to CFRP sheets. As shown by FIGS. 6 and 7, the titanium sheets 68 extend from the first and second outer sides 92 and 94 through the flange sections 112 and 122 of the angle sections 104 and 106 respectively. The titanium sheets 68 bend with the angle sections 104 and 106 to extend along the web 84 away from the flange 82. The titanium sheets 68 extend from the flange sections 112 and 122 in transition regions 114 and 124, respectively. The carbon fiber reinforced plies 66 of the angle sections 104 and 106 extend from the first and second outer sides 92 and 94, respectively through the flange sections 112 and 122, respectively and then through the transition sections 114 and 124 respectively into sections 116 and 126 of the web 84. As shown, each titanium sheet 68 of the angle sections 104 and 106 is positioned between two carbon fiber reinforced plies 66.

As shown by FIGS. 6 and 7, the titanium sheets 68 extend through the flange section 112 and 122. Within each angle member 104 and 106 the titanium sheets 68 extend from the flange 82 progressively greater distances along the web 84 as their distance from the first outer side 92 and second outer side 94, respectively, increases. Further, the distances that titanium sheets 68 extend along the web 84 from the flange 82 are the same for titanium sheets 68 that are the same distance from the first and second outer sides 92 and 94 to create the symmetric configuration shown by FIG. 6 with the longest titanium sheets 68 positioned at the middle of the web 84. As shown by FIGS. 6 and 7, the carbon fiber reinforced plies 66 that form part of the angle sections 104 and 106 respectively, extend from first and second outer sides 92 and 94 through the flange sections 112 and 122, respectively, the transition sections 114 and 124, respectively, and continue through the web sections 116 and 126. The web 84 decreases in width along the direction between the first and second outer sides 92 and 94, as distance from the flange 82 increases as number of titanium sheets at the location decreases. The width of the web 84 remains constant in the web sections 116 and 126 that are comprised only of the carbon fiber reinforced plies 66.

The T-shaped member 80 may be fabricated by a co-bonding process. The outer flange section 102 is pre-cured by laying up carbon fiber reinforced sheets 66 to form the outer flange section 102 and then pre-curing that section. The two angle sections 104 and 106 may be fabricated by forming titanium sheets 68 to the configuration as described above and as shown by FIGS. 6 and 7. The titanium sheets are prepared as described above by reference to C-shaped channel member 32. The two angle sections 104 and 106 are then pre-cured to form individual components of the member 80. The pre-cured outer flange section 102, the angle sections 104 and 106, and the noodle 108 are assembled and vacuum bagged. The assembly is then cured in an autoclave at elevated temperature and pressure to form a unitary composite member.

Figure 8:
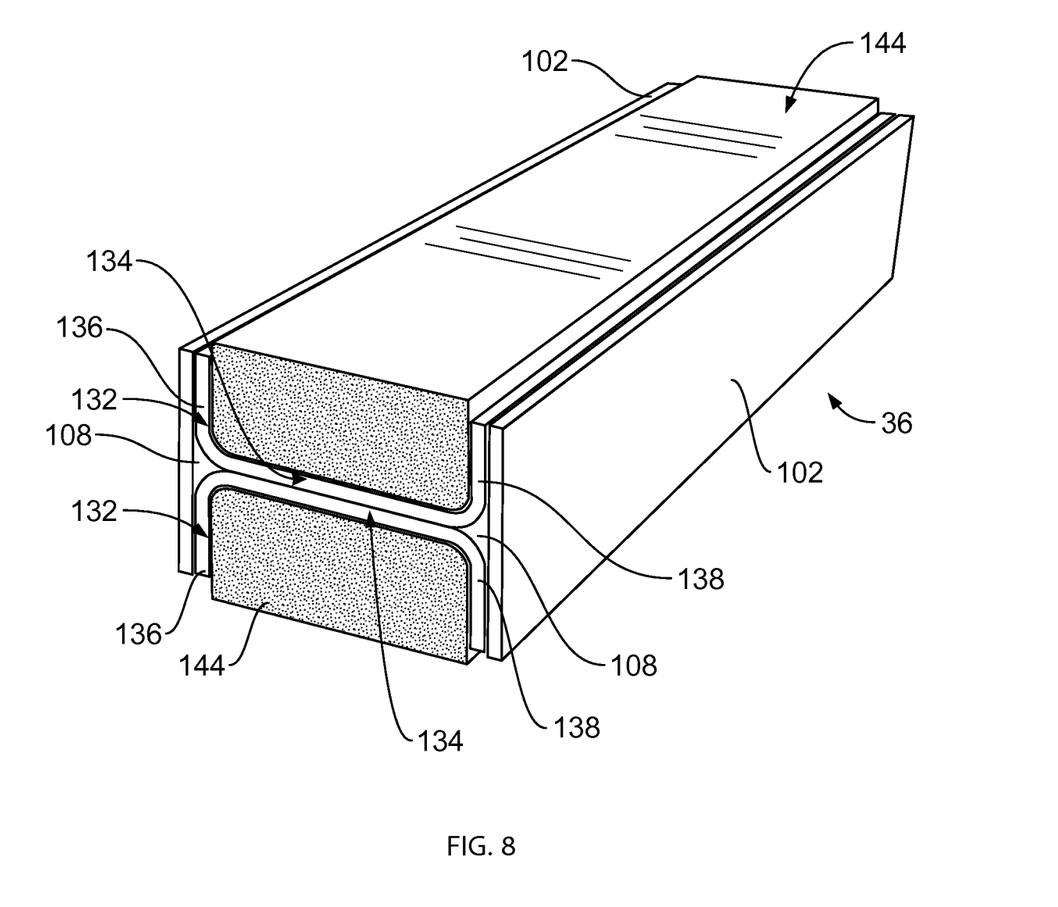
FIG. 8 is a perspective view of an I-shaped member formed of components of the member and a lay up form for fabricating the member.

An alternative to forming a member from multiple pre-cured components as described above is shown by FIG. 8. FIG. 8 shows an I-section member 36 that is formed by two C-shaped members 132 and two outer flange sections 102. Each member 132 is formed as similarly to member 32 as described above. Rather than a support such as 78 within which a member is formed, the two C-shaped members 132 are each formed around a tool 144 so that the web 134 and the flanges 136 and 138 of each member 132 are adjacent to the tool 144. A surface of the web 134 faces oppositely from the tool 144. The members 132 are placed adjacent to each other so that the surface of each member that faces oppositely from the tool 144 is adjacent to oppositely facing surface of the web 134 of the other member 132. A noodle 108 is positioned adjacent to the members 132 between the oppositely extending flanges 136 and 138. An outer flange section 102 is formed of carbon fiber reinforced plies 66 and is placed adjacent to the oppositely extending flanges 136 and 138. The assembly is vacuum bagged and cured in an autoclave at elevated temperature and pressure. This procedure requires only one curing step to form a unitary composite member.

Figure 9:
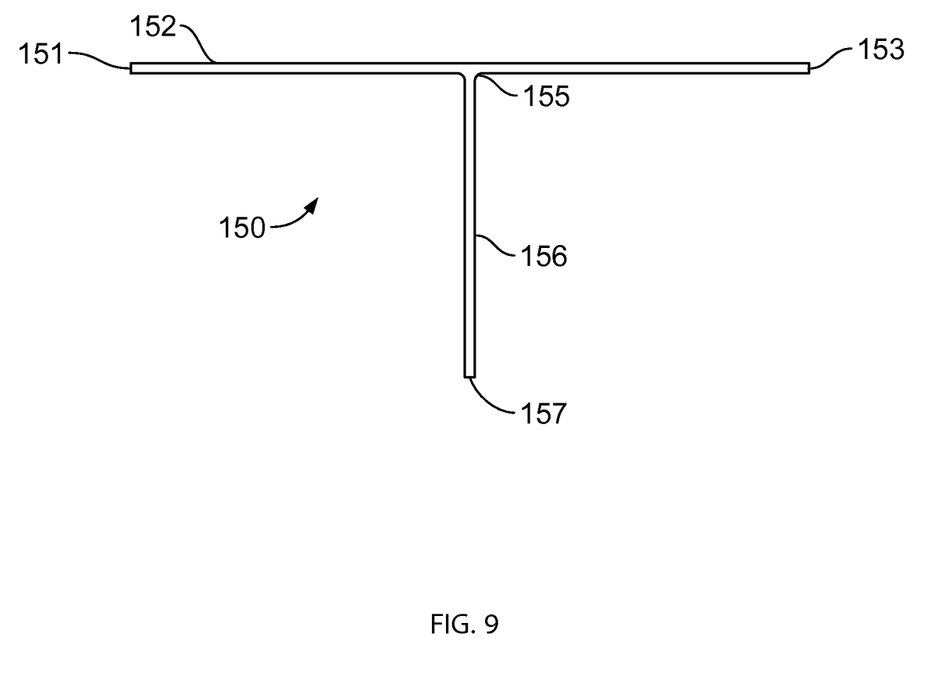
FIG. 9 is a cross section of a welded T-shaped metal reinforcement for a member.
Figure 10:
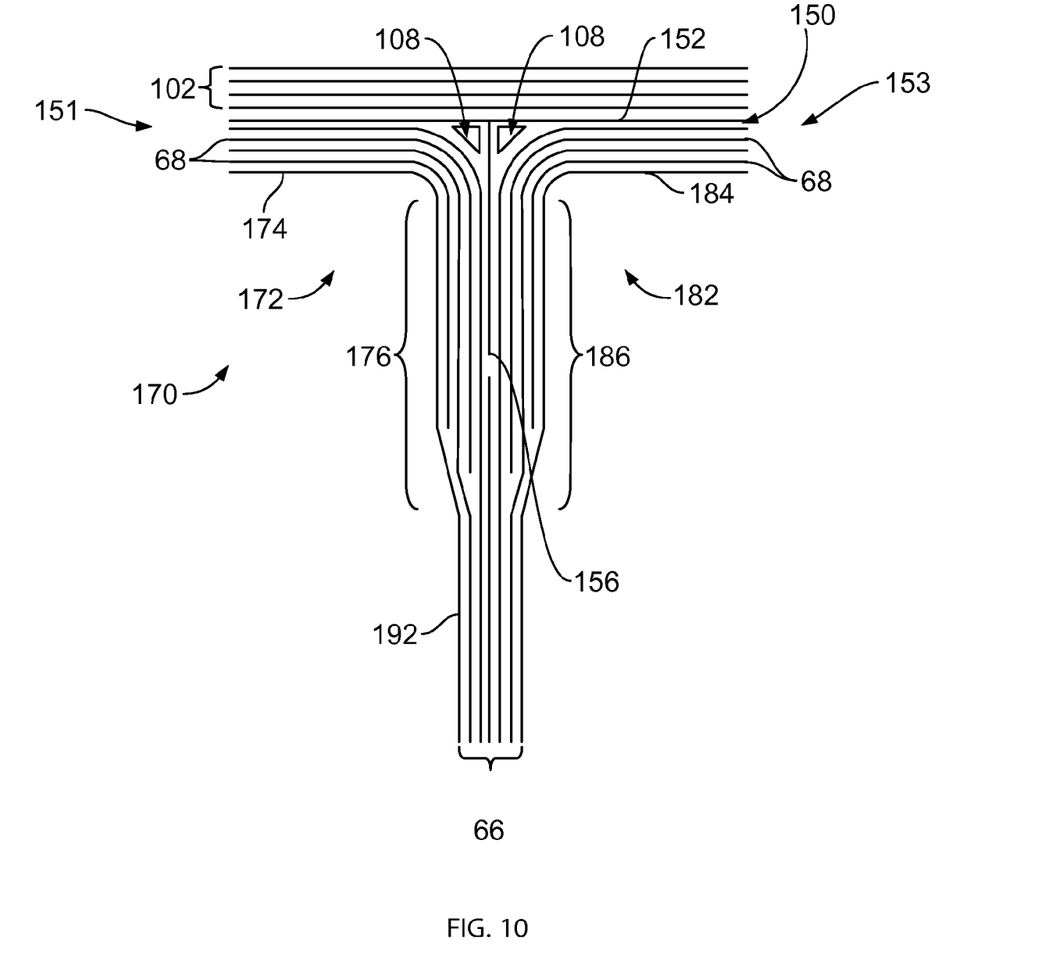
FIG. 10 is a cross section of a T-shaped member including the reinforcement shown by FIG. 9.

An alternative construction of a T-section that may form a T-shaped member or web to flange sections of an I-shaped member is shown by FIGS. 9 and 10. FIG. 9 shows a cross section of a welded titanium T section 150. The T section 150 is formed by plates 152 and 156. As shown by FIG. 9, the plate 152 extends from an end 151 to an end 153. The plate 156 extends from an end 155 to an end 157. The plate 156 is positioned so that the end 155 is adjacent to the plate 152 at a location between ends 151 and 153 and the plate 156 extends generally perpendicular to the plate 152. The plate 156 is welded to the plate 152 at the end 155.

FIG. 10 shows a cross section of a T-shaped member 170 that includes the T section 150. An outer flange section 102 extends adjacent to a surface of the plate 152 that faces oppositely from the plate 156 from the end 151 to the end 153. The outer flange section 102 is formed by laminated layers of carbon fiber reinforced plies 66. Angle portions 172 and 182 extend from the ends 151 and 153, respectively to the plate 156 adjacent to a surface of the plate 152 that faces oppositely from the outer flange section 102. The angle portions 172 and 182 include flange sections 174 and 184 that extend from the ends 151 and 153, respectively, to the plate 156 and bend to form transitions sections 176 and 186, respectively, that extend along the plate 156 generally perpendicular to and away from the plate 152. The angle portions 172 and 182 are formed similarly to the angle sections 104 and 106 described above of layers of carbon fiber reinforced plies 66 and also formed of titanium sheets 68. The titanium sheets 68 in the transition sections 176 and 186 that are close to the plate 156 extend a distance along the direction of the plate 156 that is greater than the distance that titanium sheets 68 that are farther from the plate 156 extend. Noodles 108 are positioned on either side of the plate 156 at the location that plate 156 is welded to plate 152 to fill a void between the plates 152, 156 and the angle sections 172 and 182. The carbon fiber reinforced plies 66 of the angle sections 172 and 182 extend from the titanium sheets 68 to form a carbon fiber reinforced section 192. The T-shaped member 170 may be formed as a single member so that it may be vacuum bagged and cured in an autoclave at elevated temperature and pressure to be cured in a single step to form a unitary member.

Figure 11:
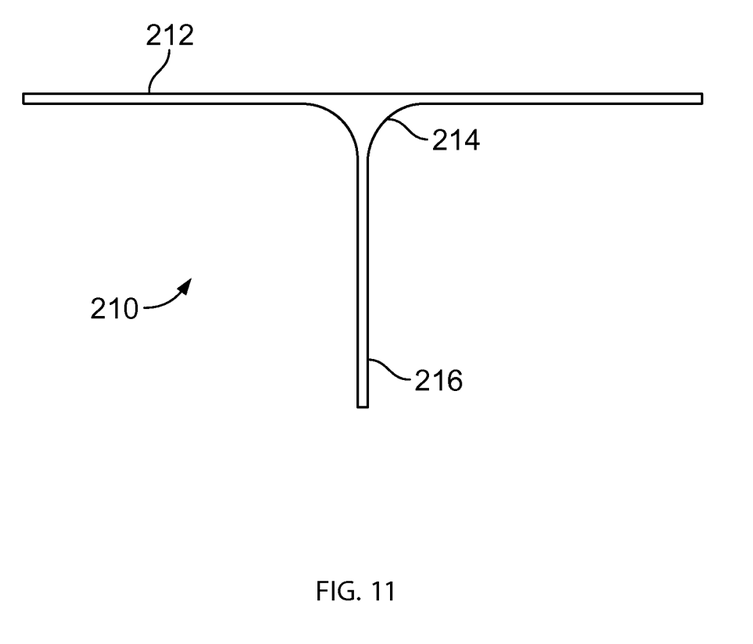
FIG. 11 is a cross section of an extruded T-shaped metal reinforcement for a laminated member.
Figure 12:
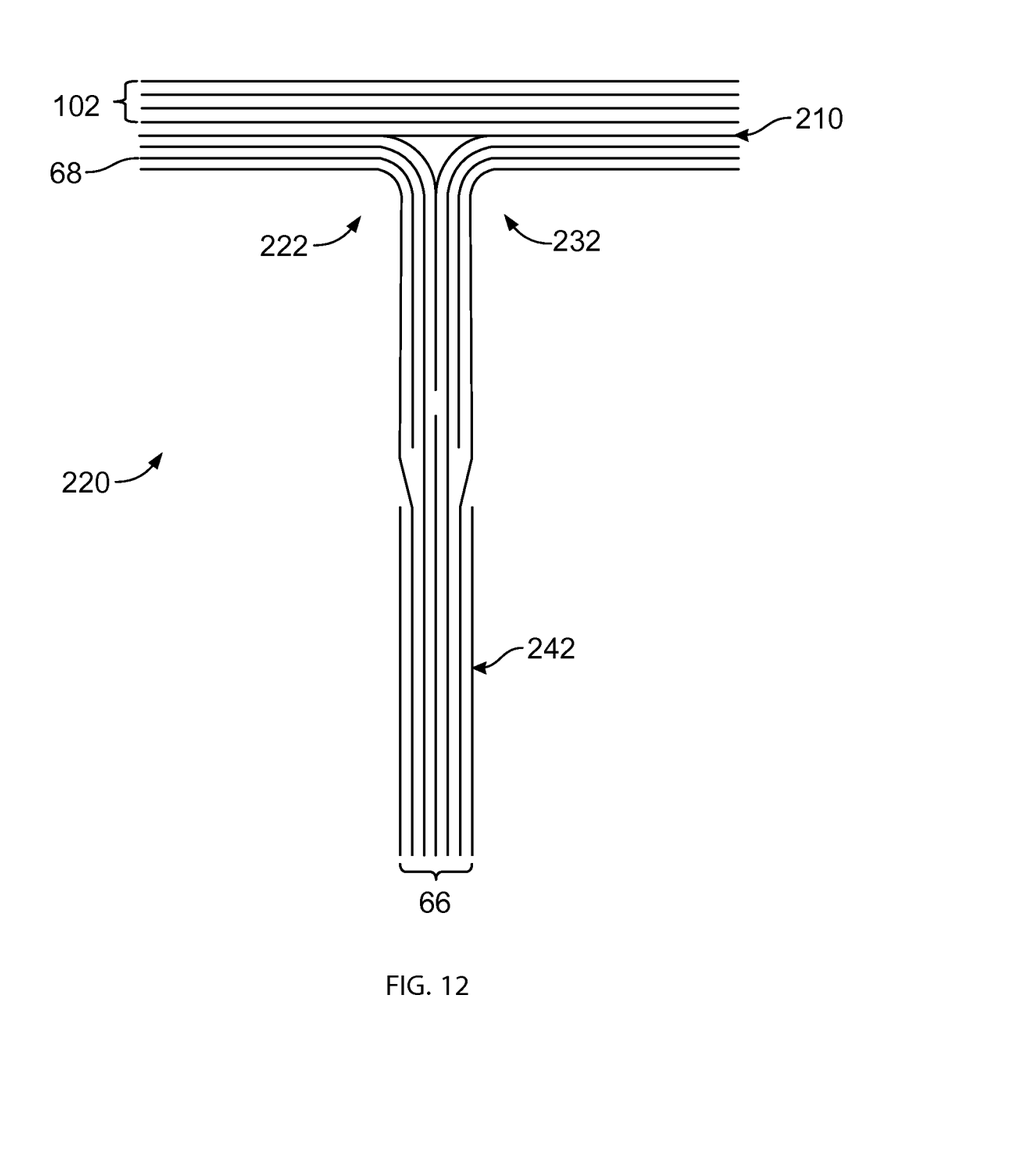
FIG. 12 is a cross section of a laminated T-shaped member including the reinforcement shown by FIG. 11 as well as further reinforcement.

An alternative construction of a T-section that may form a T-shaped member or web to flange sections of an I-shaped member is shown by FIGS. 11 and 12. FIG. 11 shows a member 210 that has a T shaped cross section similar to that of T section 150 shown by FIG. 9. The T section 210 is extruded as a single member that forms a generally planar flange plate 212, a generally planar web plate 216 that extends perpendicularly from the flange plate 212 and a transition section 214 between flange plate 212 and plate 216.

FIG. 12 shows a cross section of a T-shaped member 220 that includes the T section 210. The member 220 is similar to member 170 shown by FIG. 10 and described above. The member 220 includes member 210 having the transition section 214 that is formed to conform to adjacent angle sections 222 and 232 of the member 220. No void is formed by the angle sections 222 and 232 and the member 210, and noodles 108 are therefore not required to fill such a void. A single titanium sheet 68 extends through the angle sections 222 and 232. The web section 242 includes carbon fiber reinforced plies 66 that are positioned on oppositely facing surfaces of the that section to extend from the angle sections 222 and 232. The T-shaped member 220 may be formed as a single member so that it may be vacuum bagged and cured in an autoclave at elevated temperature and pressure to be cured in a single step to form a unitary member.

After a member is formed according to the invention, holes are drilled through the member at locations at which titanium sheets have been positioned to accept bolts or other connectors.

The present invention is not limited to use with any specific shape section. The invention can be adapted to a variety of structural members, and members may be made according to the invention in forms other than conventional structural shapes. Further, the number, shape, size and thickness of laminated metal sheets may be varied to attain a desired strength. Similarly, the metal from which sheets are formed and the materials that form the fiber reinforced sheets may be other than as described for the embodiments.

The invention claimed is:

1. A reinforced laminated elongate member having a cross section shape for supporting bending, the reinforced laminated elongate member being elongate in an elongate direction, wherein the reinforced laminated elongate member comprises a first portion extending in a first direction, a second portion extending in a second direction, and a bend between the first and second portions, the first and second directions being non-parallel and the bend comprising a transition between the first and second portions, and wherein the bend bends about an axis extending parallel to the elongate direction, the reinforced laminated elongate member further comprising:
   a first layer of curable ply and a second layer of curable ply, wherein the first and second layers of curable ply extend along the first portion, the bend, and the second portion of the elongate member;
   a plurality of metal sheets disposed between the first layer of curable ply and the second layer of curable ply, wherein the plurality of metal sheets are bonded directly adjacent to each other with an adhesive film, wherein the plurality of metal sheets extend from the first portion, through the bend, and into the second portion, and have staggered end points that terminate in the second portion, wherein in a direction extending across a thickness of the second portion the end points terminate in the second portion at progressively increasing distances away from the first portion; and
   a plurality of internal curable plies disposed between the first layer of curable ply and the second layer of curable ply, wherein the plurality of internal curable plies abut and extend from the staggered end points of the plurality of metal sheets in the second portion;
   wherein the first and second layers of curable ply, the plurality of metal sheets, and the plurality of internal curable plies form a unitary member, wherein the thickness of the second portion is substantially uniform at least along a section of the second portion having the staggered end points.

2. The reinforced laminated member of claim 1 wherein an opening extending through the member at a location at which the member includes the metal sheets, the hole being sized to accept a connector through the member.

3. The reinforced laminated member of claim 1 wherein the curable plies include carbon fibers and the plies are impregnated with an adhesive matrix.

4. The reinforced laminated member of claim 1 wherein the plurality of metal sheets are formed of titanium.

5. The reinforced laminated member of claim 1 wherein the first portion is a flange section and the second portion is a web section, wherein the formed metal sheets extend from the flange section of the reinforced member to the web section of the reinforced member.

6. The reinforced laminated member of claim 5 wherein the plurality of metal sheets include two or more metal sheets each sheet formed to extend a flange distance from an outer edge of the flange section of the reinforced laminated member along that flange section to the adjacent web section of the reinforced laminated member and the metal sheet then extends a web distance along the web section of the reinforced laminated member from the flange section of the reinforced laminated member, the web distance of a metal sheet increasing as the flange distance of the metal sheet increases and the two or more metal sheets are positioned within the reinforced laminated member such that a metal sheet having longer flange distance is adjacent to a metal sheet having a shorter flange distance and the metal sheet having a longer flange distance extends farther from the outer edge of the flange section of the reinforced laminated member and then farther along the web section of the reinforced laminated member than an adjacent metal sheet having a shorter flange distance and web distance.

7. The reinforced laminated member of claim 1 wherein the member comprises one of a T-shaped member, an I-shaped member, a C-shaped member, and a hat-shaped member.

8. The reinforced laminated member of claim 5, wherein the end points of at least three consecutive metal sheets of the plurality of metal sheets terminate in the web section at progressively increasing distances away from the flange section.

9. The reinforced laminated member of claim 8, wherein a difference between the increasing distances from the flange section of each set of adjacent metal sheets of the at least three consecutive metal sheets is the same.

10. The reinforced laminated member of claim 8, wherein in a direction parallel to a length of the web section a distance between end points of each set of adjacent metal sheets of the at least three consecutive metal sheets is the same.

11. The reinforced laminated member of claim 1, wherein the direction extending across the thickness of the second portion also extends away from the first portion.

* * * * *